United States Patent Office 3,605,554
Patented Sept. 20, 1971

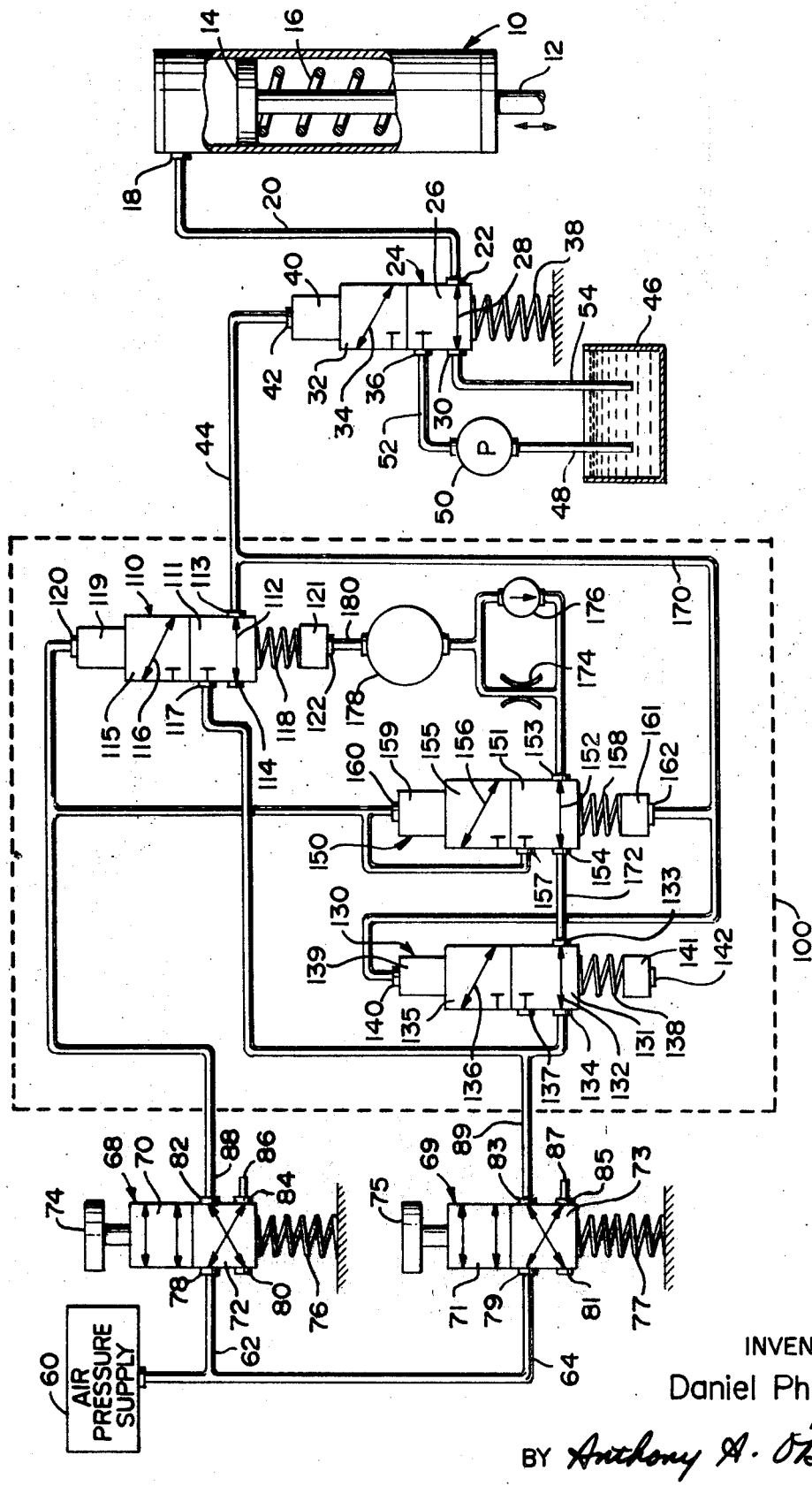

3,605,554
FLUID CONTROL SAFETY SYSTEM
Daniel Philbrick, Phoenixville, Pa., assignor to
Robertshaw Controls Company, Richmond, Va.
Filed Mar. 5, 1970, Ser. No. 16,908
Int. Cl. F16p *3/22;* F16b *13/01*
U.S. Cl. 91—38                                    10 Claims

ABSTRACT OF THE DISCLOSURE

A fluid control system utilized in conjunction with a pair of manually operated fluid valves so spaced as to necessitate the use of both hands by an operator for causing actuation of a fluid motor, such as a hydraulic press. The two manually operated valves selectively apply pressurized fluid to a pair of fluid lines which are connected to a main flow valve and a pair of control valves. The control valves are connected through a pressure storage network to the main flow valve for preventing actuation of the main flow valve in the event that both of the manually operable valves are not actuated within a preset time interval.

BACKGROUND OF THE INVENTION

Field of the invention

The present invention relates generally to safety apparatus for manually operated fluid control systems, and more particularly, to a new and improved fluid control safety system necessitating substantially simultaneous actuation of a pair of input devices to produce system actuation.

Description of the prior art

Hydraulic machinery, capable of exerting relatively large forces within a confined area, have been in extensive use for a number of years. In many cases, such machines are utilized to perform a mechanical operation on a relatively small workpiece which is typically inserted into the machine by an operator who thereafter removes his hands from the proximate area of the workpiece and then actuates the machine as by a manually operated lever. Very often, in order to increase his output, an operator may employ one hand to insert the workpiece into the machine and his other hand to operate the actuating lever. Such actions are inherently dangerous and often result in serious injury to the operator's hands.

The prior art is generally cognizant of the above-mentioned problem and has offered numerous solutions conventionally taking the form of a pair of serially connected manually operated valves which are spaced from each other so as to require the use of both hands of the operator in order to actuate the particular fluid motor being employed. Furthermore, various more complex systems have refined the serially connected valve control arrangement so that both manual valves must be operated nearly simultaneously such that the operator is precluded from permanently tying down one of the valves to permit one hand operation.

While such prior art control systems have generally served the purpose, they have not proved satisfactory under all conditions of operation for a number of reasons, one of which is that they are often highly complex. This factor not only increases the initial cost of the apparatus, but inherently increases maintenance outlays while substantially reducing overall system reliability.

SUMMARY OF THE INVENTION

The present invention is summarized in that a fluid control safety system for a fluid motor includes an inlet adapted to communicate with a source of pressurized fluid; a pair of manually operated valves communicating with the inlet; a pressure operated relay communicating with the pair of manually operated valves and having an outlet port communicating with the fluid motor, the pressure operated relay having a normally off position and being actuated to an on position in response to pressurized fluid from both the pair of manually operated valves to apply pressurized fluid to the fluid motor; the pressure operated valve having a second port and being locked in the off position in response to fluid pressure at the second port; a control assembly communicating with the pair of manually operated valves and the second port for applying a fluid pressure to the second port of predetermined time delay after operation of either of the pair of manually operated valves whereby the pressure operated relay is locked in the off position; and a feedback assembly communicating with the outlet port of the pressure operated relay and the control means and cooperating with the control means to block the application of fluid pressure to the second port in response to fluid pressure at the outlet port whereby the feedback assembly assures actuation of the fluid motor in response to substantially simultaneous operation of the pair of manually operated valves.

It is an object of the present invention to construct a fluid control safety system utilizing fewer components than the number of components heretofore required.

The present invention has an additional object in that a pair of spaced manually operated valves must be operated within a preselected time interval in order to provide an output pressure signal and that both valves must thereafter be released prior to the initiation of a subsequent operation.

It is a further object of the present invention to construct a fluid control safety system utilizing three fluidic diverting relays and a delayed action storage device.

The present invention is advantageous over conventional fluid control safety systems in that it is relatively simple in construction and is readily adaptable to inexpensive fabrication techniques.

Other objects and advantages of the present invention will be more fully apparent from the following description of a preferred embodiment when taken in conjunction with the accompanynig drawing.

BRIEF DESCRIPTION OF THE DRAWING

The figure is a schematic diagram of a fluid motor energizing network embodying a fluid control safety system according to the present invention.

DESCRIPTION OF THE PREFERRED EMBODIMENT

Referring to the drawing, the fluid control safety system of the present invention is embodied in an energizing network for a fluid motor which may be of any suitable type such as a hydraulic cylinder 10. Hydraulic cylinder 10 has an output shaft 12 adapted to be axially moved by a piston 14 which is biased by a spring 16 such that shaft 12 is normally retracted within the cylinder. A port 18 in a wall of the cylinder 10 communicates with the interior of the cylinder so as to permit hydraulic fluid under pressure to act upon piston 14 and cause the movement of shaft 12 for operating any suitable machine such as a hydraulic press (not shown). Port 18 is connected by a conduit 20 to a common port 22 of a fluidic diverting relay 24. Diverting relay 24 may be of any suitable construction and is schematically illustrated as including a first valving block 26 having an internal passage 28 establishing communication between ports 22 and 30, and a second valving block 32 having an internal passage 34 establishing communication between ports 22 and 36. The two valving blocks 26 and 32 are normally biased by coil spring 38 to positions wherein port 30 is normally open and port 36 is normally closed, with port 22 designated as a common port. The relay 24 is moved from its normal position to an actuated position by any suitable means, such as a piston and/or diaphragm in an actuating chamber 40 which has a port 42 communicating with a pneumatic pressure line 44. Fluid for the hydraulic cylinder 10 is obtained from a fluid reservoir or sump 46 through a suction line 48 and a fluid pump 50 which communicates with port 36 of relay 24 through a pressure line 52. This fluid discharges from the cylinder 10 through port 30 and a suitable conduit 54 back to sump 50 to form a closed fluidic circuit.

Pressurized air for actuating the diverting relay 24 is supplied by a common air pressure source 60 which is connected by branched conduits 62 and 64 to manually operated valves 68 and 69, respectively. Each valve includes a pair of valving blocks 70–71 and 72–73 which are connected at one end to a two-position manually operated pushbutton 74–75 and at their other end to a biasing spring 76–77. Each valving block has a pair of internal passages therethrough, so arranged that the passages of one or the other of the valving blocks are in register with inlet ports 78–79 and 80–81 and outlet ports 82–83 and 84–85 for each of the two positions of the pushbutton 74–75. Thus, in an unactuated or static state, wherein pushbutton 74–75 is not depressed, biasing spring 76–77 moves valving blocks 70–71 and 72–73 to positions such that the crossed internal channels are operative to interconnect port 78–79 with port 84–85, and to interconnect port 82–83 with port 80–81. Similarly, when pushbutton 74–75 is depressed, the valving blocks are moved to their actuated positions wherein port 78–79 is interconnected with port 82–83, and port 80–81 is interconnected with port 84–85.

Input ports 78 and 79 of valves 68 and 69 are respectively connected to branched conduits 62 and 64, while ports 80 and 81 are adapted to provide selective venting for the system. Furthermore, outlet ports 84 and 85 are closed by plugs 86 and 87, respectively, while ports 82 and 83 are connected to respective input conduits 88 and 89 which feed pressurized air to the fluid control safety system of the present invention, indicated generally at 100.

Fluid control safety system 100 includes three fluid diverting relays 110, 130 and 150 which may be of any suitable construction and may be identical to each other. Each relay is schematically shown as including a first valving block 111–131–151 having an internal passage 112–132–152 establishing communication between ports 113 and 114, 133 and 134, and 153 and 154, respectively, and a second valving block 115–135–155 having an internal passage 116–136–156 establishing communication between ports 113 and 117, 133 and 137, and 153 and 157, respectively. The two valving blocks are normally biased by coil spring 118–138–158 to positions wherein port 114–134–154 is normally open and port 117–137–157 is normally closed, with port 113–133–153 designated as a common port. Each of the relays 110, 130 and 150 is moved from its normal position to an actuated position by any suitable means, such as a piston and/or diaphragm operator in an actuating chamber 119–139–159 which has a port 120–140–160. In addition, each of the relays may be locked or inhibited from actuation by any suitable means, such as a piston and/or diaphragm operator in an inhibit chamber 121–141–161 which cooperates with biasing spring 118–138–158 to increase the force exerted thereby to a level sufficiently large to prevent the valving blocks from being moved to their actuating position by fluid pressure at actuating chamber 119–139–159. Fluid pressure may be placed in communication with inhibit chambers 121, 141 and 161 through ports 122, 142 and 162, respectively, so as to permit selective locking of the relays, as will be explained below.

Referring to the details of the fluid circuit of the present invention, input conduit 88 is connected to port 120 of relay 110 as well as to ports 160 and 157 of relay 150, while input conduit 89 is connected to port 134 of relay 130 and port 117 of relay 110. Pressure line 44 is similarly connected to common port 113 of main relay 110 and a feedback conduit 170 which establishes communication between common port 113 and port 162 of relay 150 and port 140 of relay 130. Relays 130 and 150 are interconnected at their respective ports 133 and 154 by a fluid line 172 so as to provide a fluid flow path therebetween.

The control system 100 further includes a flow restrictor 174 and a one-way valve 176 which are connected in parallel relationship between port 153 of relay 150 and a pressure storage tank or accumulator 178. The one-way valve 176 is oriented such that its outlet communicates with relay 150 to provide an unrestricted flow path around the flow restrictor 174 in the direction indicated by the arrow. The pressure storage tank 178 is connected with inhibit chamber 121 of main relay 110 through conduit 180 and port 122 to complete the fluid circuit of the control system 100.

In operation, manually operated pneumatic valves 68 and 69 are located in spaced relationship with each other such that an operator is required to utilize both hands in order to simultaneously depress the two valves for energizing the system from its standby or unactuated state. In the standby state, air pressure supply 60 is isolated from control system 100 by valves 68 and 69 which respectively direct the pressurized air through inlet ports 78 and 79 to outlet ports 84 and 85 where fluid flow is blocked by plugs 86 and 87. At this same time, input conduits 88 and 89 are vented through exhaust ports 82 and 80 of valve 68 and ports 83 and 81 of valve 69, respectively. Therefore, input conduit 88 is normally unpressurized, and a fluid pressure signal does not appear within actuating chamber 119 of the pressure operated valve or diverting relay 110. Consequently, relay 110 assumes its off or static position and the input conduit 89 is blocked at normally closed port 117 to prevent fluid pressure from appearing in output pressure conduit 44. As a result, actuating chamber 40 of hydraulic diverting relay 24 receives no fluid pressure such that the relay 24 also remains in its normally off position permitting the venting of hydraulic cylinder 10 through the relay to the hydraulic fluid reservoir 46. The biasing spring 16 thus acts against piston 14 to retract output shaft 12 and discharge hydraulic fluid from within the cylinder to the reservoir 46.

When operation of the hydraulic cylinder is desired, manually operated valves 68 and 69 are simultaneously actuated by the operator thereby placing air pressure supply 60 in communication with input conduits 88 and 89. Pressurized fluid is thereafter fed through input conduit 88 and port 120 to the actuating chamber of diverting relay 110 causing the relay to move to its on position such that normally closed port 117 is opened and is placed in communication with outlet port 113 through internal passage 116. Pressurized fluid is then fed from input conduit 89 through relay 110 to the output conduit 44 and thence to the actuating chamber 40 of the hydraulic diverting relay 24 at port 42 causing movement of the relay to its on position. When valve 24 is actuated, a hydraulic fluid flow path is established from reservoir 46 through conduit 48, hydraulic pump 50, pressure line 52, port 36, internal passage 34 of the diverting relay 24, port 22, hydraulic conduit 20 and port 18 to the hydraulic cylinder 10. In this manner, pressurized hydraulic fluid is fed from pump 50 to the interior of the hydraulic cylinder 10 to move piston 14 downwardly against the biasing force of spring 16 causing axial movement of output shaft 12 which results in the operation of the hydraulic press (not shown).

At this same time, the pressurized fluid appearing in output conduit 44 is applied by feedback conduit 170 to the actuating chamber 139 of control relay 130 as well as to the inhibit chamber 161 of control relay 150. This causes actuation of relay 130 to its on position to block inlet port 134 and prevent the flow of pressurized fluid from input conduit 89 to fluid conduit 172. In addition, the fluid pressure at inhibit chamber 161 prevents actuation of control relay 150 by the fluid pressure which is applied through port 160 from input conduit 88; pressurized fluid in conduit 88 is thus blocked at inlet port 157 from communicating with outlet port 153 of diverting relay 150.

Since the control valve 130 is actuated by the fluid pressure within feedback conduit 170, fluid is precluded from flowing from input conduit 89 to the flow restrictor 174. Similarly, since the fluid pressure at inhibit chamber 161 prevents actuation of control relay 150, pressurized fluid cannot flow from input conduit 88 through ports 157 and 153 of relay 150 to the flow restrictor 174. In this manner, fluid pressure is prevented from building up within pressure storage tank 178 such that no pressure is applied through port 122 to the inhibit chamber 121 of the main diverting relay 110. Thus, the fluid pressure within feedback conduit 170 both actuates control relay 130 and inhibits actuation of control relay 150 so as to isolate inhibit chamber 121 of valve 110 from the incoming pressurized fluid. This permits main valve 110 to remain actuated for pressurizing output conduit 44 and producing energization of hydraulic cylinder 10.

When energization of hydraulic cylinder 10 is no longer desired, both valves 68 and 69 must be released to block the flow of pressurized fluid to input conduits 88 and 89 and vent the system. This removes fluid pressure from the actuating chamber 120 of main diverting relay 110 such that the relay drops back to its normally off position to block inlet port 117 and permit venting of output conduit 44 through internal passage 112 and ports 113 and 114. In this manner, pressurized fluid is removed from actuating chamber 40 of the hydraulic relay 24 blocking the flow of high pressure hydraulic fluid to the hydraulic cylinder 10 and simultaneously placing the hydraulic cylinder in communication with discharge conduit 54 to allow piston 14, and consequently shaft 12, to move upwardly under the biasing force exerted by spring 16. The system is thus placed in its standby state, as defined above.

The fluid control safety system 100 cooperates with the two manually operated valves 68 and 69 such that operation of the hydraulic cylinder 10 is produced only upon substantially simultaneous operation of both manually operated valves as described above. As can be seen in the drawing, if the operator attempts to cause operation of the hydraulic cylinder 10 by depressing only valve 68, pressurized fluid will be supplied to input conduit 88 and will cause actuation of the main diverting relay 110; however, input conduit 89 will not be pressurized and no fluid will flow through the relay to output conduit 44. Similarly, if the operator attempts to energize the hydraulic cylinder 10 by operating pneumatic valve 69 alone, input conduit 88 will not be pressurized so that no fluid pressure will be applied to the main diverting relay 110 at port 120; thus, the pressurized fluid within input conduit 89 will be isolated from output conduit 44 by closed port 117.

As explained above, operation of only one of the two manually operated valves 68 and 69 will not produce energization of the hydraulic cylinder 10. In addition, and in order to prevent the attainment of one-hand operation of the fluid control system of the present invention by permanently tying down one of the two manually operated valves, control relays 130 and 150 cooperate with flow restrictor 174, pressure storage tank 178, and feedback conduit 170 to preclude the actuation of the main diverting relay 110 in the event that both of the manually operated valves 68 and 69 are not depressed within a preselected time interval.

Referring more specifically to the operation of the system when an operator attempts to avoid two-hand operation, if manually operable valve 68 is tied down, pressurized fluid will appear at input conduit 88 and will be fed to actuating chamber 119 of the main diverting relay 110 as well as to the actuating chamber 159 and normally closed port 157 of control relay 150. As a result, the main diverting relay 110 will become momentarily actuated; however, since no pressurized fluid is fed to inlet port 117 from input conduit 89, no fluid pressure will appear within output conduit 44 or feedback conduit 170. Since pressurized fluid is not fed to feedback conduit 170, the inhibit chamber 161 of control relay 150 will not receive a fluid pressure signal thus permitting actuation thereof in response to the pressurized fluid fed to its actuating chamber 159. Since port 157 of control relay 150 is connected to input conduit 88, pressurized fluid will thereafter flow through port 157, internal passage 156 and port 153 to the flow restrictor 174 and thence to the fluid pressure storage tank 178. In this manner, fluid pressure will build up within tank 178 at a rate determined by the flow rate setting of restrictor 174 and will be applied through conduit 180 to the inhibit chamber 121 of main diverting relay 110. The application of sufficient pressurized fluid to the inhibit chamber 121 causes diverting relay 110 to drop back to its normally off position, assuring isolation of pressure line 44 from incoming fluid pressure.

Thus, with the manually operated valve 68 tied down, the diverting relay 150 is actuated causing the pressurization of storage tank 178 and the locking-out of main diverting relay 110 by pressure applied to its inhibit chamber 121. If the operator thereafter attempts to initiate actuation of hydraulic cylinder 10 by depressing manually operated valve 69, the pressurized fluid in input conduit 89 will be precluded from passing through main relay 110 at the normally blocked port 117 such that output conduit 44 is prevented from becoming pressurized. Since feedback conduit 170 is in communication with output conduit 44, no fluid pressure will be fed back to the inhibit chamber 161 of diverting relay 150 thereby allowing the diverting relay 150 to remain in its actuated position to maintain the pressurization of storage tank 178.

In order to reset the system, it is necessary to release manually operated valve 68 for removing fluid pressure from actuating chamber 159 of the diverting relay 150 which thereafter reverts to its normally off position. The release of relay 150 establishes a venting path for the pressure storage tank 178 through one-way valve 176, port 153, internal passage 152 of control relay 150, port 154, fluid line 172, port 133, internal passage 133 of control relay 130, port 134, input conduit 89, and ports 83 and 81 of manually operated valve 69. The one-way valve 176 thus by-passes flow restrictor 174 and rapidly releases the pressure within the storage tank 178 permitting the system to once again assume its standby condition for subsequent normal operation.

A similar lock-out condition is produced if the operator attempts to avoid two-hand operation by tying down manually operated valve 69. Under such conditions, input conduit 89 will become pressurized so as to apply fluid pressure to inlet port 117 of diverting relay 110. Since no fluid pressure signal is applied to the actuating chamber 119 thereof, diverting relay 110 remains in its normally off position such that pressurized fluid is precluded from flowing to outlet conduit 44 as well as to the feedback conduit 170. For this reason, actuating chamber 139 of the control relay 130 receives no pressurized fluid and remains off. Similarly, since the control relay 150 receives no actuating pressure signal at its actuating chamber 159, it also remains off so that both relays cooperate to provide a serial flow path to feed pressurized fluid from input conduit 89 to the flow restrictor 174 and thence to the pressure storage tank 178. As before, the pressure built up within tank 178 communicates with the inhibit chamber 121 of main diverting relay 110 through port 122 to prevent subsequent actuation thereof.

With manually operated valve 69 tied down, and a sufficient pressure built up within storage tank 178, subsequent operation of manually operated valve 68, while causing a pressure input signal to appear at the actuating chamber 119 of the main diverting relay 110, will not cause actuation thereof due to the fluid pressure existing within inhibit chamber 121. The fluid control safety system of the present invention is thus locked-out once again and can only be recycled to its standby condition by releasing manually operated valve 69 so as to provide a discharge or venting path for the pressure tank 178 through one-way valve 176, control relays 150 and 130, and ports 83 and 81 of valve 69. Upon release of the pressure within the storage tank 178, and the resultant removal of fluid pressure at inhibit chamber 121 of the main diverting relay 110, the system is reset for subsequent energization.

Thus, it can be easily seen that a fluid pressure output signal will only be produced within outlet conduit 44 if both manually operated valves 68 and 69 are operated within the preselected time interval set by the flow rate setting of restrictor 174, during which a sufficient pressure is being built up within storage tank 178 to inhibit or lock-out the main relay 110. In other words, main valve 110 will be inhibited from actuation by fluid pressure stored in tank 178 unless both manually operated valves 68 and 69 are operated within the time delay required for such inhibit pressure to be built up with the storage tank. As described above, actuation of both valves 68 and 69 blocks the flow of pressurized fluid to the storage tank and will prevent a lock-out of main valve 110 if they are both operated within the aforementioned time interval.

In this manner, while the fluid control safety system of the present invention is simple in construction, its operation assures the safety of the operator by necessitating the use of both hands to cause movement of the particular machine being controlled. It should also be noted, that the present invention permits the use of identical diverting relays so as to reduce both the complexity and cost of manufacture of the overall system. While the present fluid control system has been described herein as a pneumatic system, similar operation can be obtained through the use of hydraulic fluid rather than pressurized air in accordance with the general principles of operation of the present invention.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A fluid control safety system for a fluid motor comprising,
    inlet means adapted to communicate with a source of pressurized fluid;
    a pair of manually operated valves communicating with said inlet means;
    a pressure operated relay communicating with said pair of manually operated valves and having an outlet port communicating with the fluid motor, said pressure operated relay having a normally off position and being actuated to an on position in response to pressurized fluid from both of said pair of manually operated valves to apply pressurized fluid to the fluid motor;
    said pressure operated relay having a second port and being locked in said off position in response to a particular fluid pressure at said second port;
    control means communicating with said pair of manually operated valves and said second port for applying said particular fluid pressure to said second port a predetermined time delay after operation of either of said pair of manually operated valves whereby said pressure operated relay is locked in said off position; and
    feedback means communicating with the outlet port of said pressure operated relay and said control means and cooperating with said control means to block the application of said particular fluid pressure to said second port in response to fluid pressure at said outlet port whereby said feedback means assures actuation of said fluid motor in response to operation of both of said pair of manually operated valves within said predetermined time delay.

2. The invention as recited in claim 1 wherein said control means includes valving means communicating with said pair of manually operated valves and said feedback means, and time delay means communicating with said valving means and said second port for applying said particular fluid pressure to said second port said predetermined time delay after receipt of pressurized fluid from said valving means.

3. The invention as recited in claim 2 wherein said valving means includes a pair of pressure actuated control relays.

4. The invention as recited in claim 3 wherein each one of said pair of pressure actuated control relays communicates with a respective one of said pair of manually operated valves.

5. The invention as recited in claim 4 wherein each of said pair of pressure actuated control relays communicates with said time delay means for controlling the application of pressurized fluid from a respective one of said pair of manually operated valves to said time delay means.

6. The invention as recited in claim 5 wherein one of said pair of pressure actuated control relays communicates with said time delay means through the other of said pair of pressure actuated control relays.

7. The invention as recited in claim 6 wherein said feedback means cooperates with said pair of pressure actuated control relays to produce actuation of said one of said pair of pressure actuated control relays and to preclude actuation of said other of said pair of pressure actuated control relays in response to fluid pressure at said outlet port of said pressure operated relay.

8. The invention as recited in claim 5 wherein said time delay means includes a flow restrictor, a pressure storage tank, and a one-way valve.

9. The invention as recited in claim 8 wherein said one-way valve is connected across said flow restrictor and communicates with said pair of pressure actuated control relays and said pressure storage tank.

10. The invention as recited in claim 9 wherein said one-way valve is connected to selectively by-pass said flow restrictor for releasing stored fluid pressure within said pressure storage tank.

References Cited

UNITED STATES PATENTS 3,428,084   2/1969   Carls _____ 91—424X

ALLAN D. HERRMAN, Primary Examiner

U.S. Cl. X.R.

91—424; 192—131R